United States Patent [19]
Rose

[11] 3,823,526
[45] July 16, 1974

[54] FASTENING DEVICE
[76] Inventor: Rolland H. Rose, 2527 Midway Rd., Duluth, Minn. 55810
[22] Filed: Sept. 15, 1972
[21] Appl. No.: 289,426

[52] U.S. Cl............................. 52/758 F, 151/37
[51] Int. Cl............................................. F16b 5/02
[58] Field of Search .... 85/4, 32 R; 151/41.7, 41.73, 151/37; 287/189.36 F

[56] References Cited
UNITED STATES PATENTS
2,967,593  1/1961  Cushman .................. 151/41.7 UX
3,141,488  7/1964  Wootton .................... 151/41.7 X FOREIGN PATENTS OR APPLICATIONS
688,092  5/1930  France ............................ 85/4

Primary Examiner—Jordan Franklin
Assistant Examiner—Wayne L. Shedd
Attorney, Agent, or Firm—Wicks & Nemer

[57] ABSTRACT

A device for fastening two pieces of material together including a threaded base member having a concave recess in one end and at least one projection for engaging a surface of a member to be connected together with a threaded connecting member and a threaded draw-up plug for threaded engagement with the base member and having a flared portion extending therefrom together with means for drawing up the draw-up plug upon the base member to force a portion of a piece of flat stock into the recess and cause the projection to engage the piece of stock with the connecting member threadedly engaged with the draw-up plug.

3 Claims, 6 Drawing Figures

PATENTED JUL 16 1974 3,823,526

FASTENING DEVICE

SUMMARY

The invention relates to a device for fastening two pieces of material together, more particularly as used in fastening sheet metal together for use in the furnace, airplane and auto industries with which one piece of metal may be deformed. The device provides a threaded member securely anchored to one piece of stock which receives a bolt extended through a second piece of stock for connection of the two pieces of stock together.

In the drawings forming part of this application:

Figure 1:
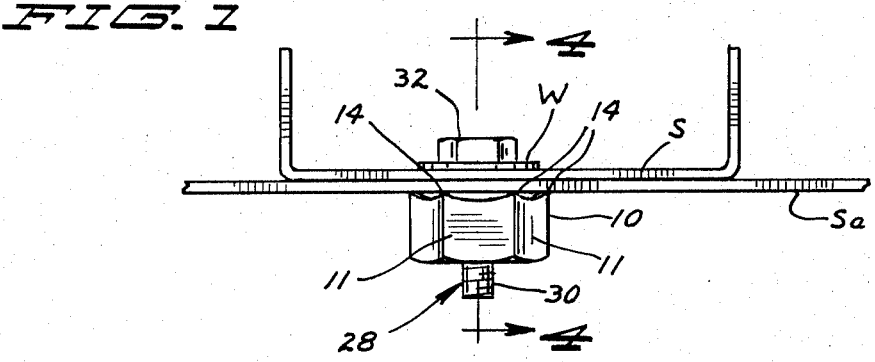
FIG. 1 is a side elevational view of two members connected together by means of a connector embodying the invention.
Figure 2:
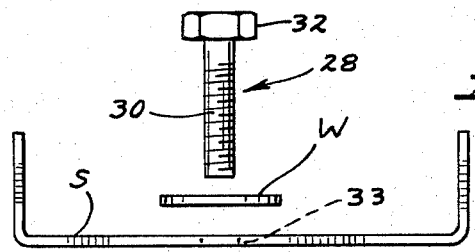
FIG. 2 is an exploded view of the elements shown in FIG. 1.
Figure 3:
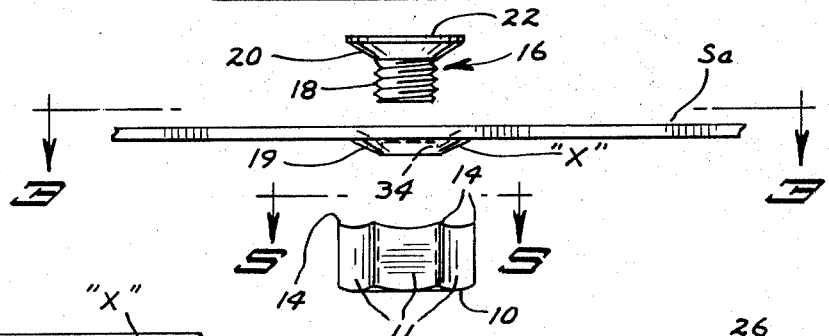
FIG. 3 is a top plan view of one of the connected members.
Figure 3:
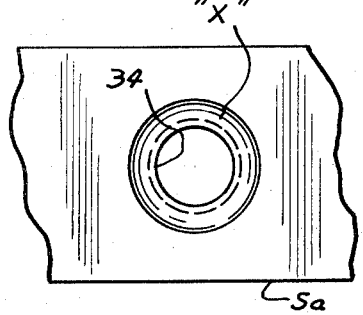
Figure 6:
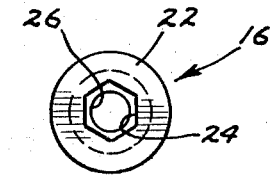
FIG. 6 is a top plan view of the draw-up plug member.
Figure 4:
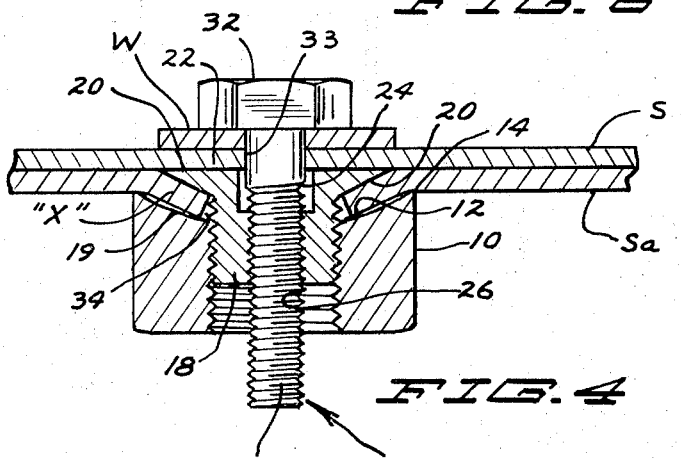
FIG. 4 is a sectional view on the line 4—4 of FIG. 1.
Figure 5:
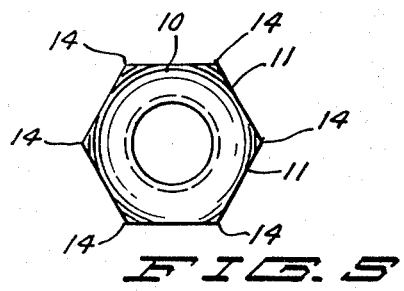
FIG. 5 is a top plan view of the base nut.

Referring to the drawings in detail, the connector A includes the base nut 10 which is formed of a conventional threaded hexagonal nut having the flat sides 11. The upper surface of the base nut 10 is cupped by means of the concave recess 12 which produces the projections as at 14 at the upper edges of the junctures of the flat sides 11 of the nut.

Further provided is the draw-up plug 16 which has the threaded shank 18 which terminates in the outwardly and upwardly flared circular flange portion 20 which terminates in the circular flat top 22 normal to the axis of the shank 18. The flange portion 20 has extending thereinto from the top 22 the hexagonal socket 24 which terminates in the axial threaded bore 26.

The numeral 28 designates a take-up bolt with the threaded shank 30 and the hexagonal head 32. Illustrated is a piece of stock S connected to the piece of stock Sa by means of the connector A. A washer W is shown as a supporting member but is not essential to the invention.

The device A is used by drilling the hole 34 in the stock Sa. The base nut 10 is then placed against the surface of the stock Sa. Then the draw-up plug 16 is inserted in the hole 34 and in threaded engagement with the base nut 10. The plug 16 is then drawn up on the nut 10 and upon the stock Sa by means of an Allen wrench in the socket 24 whereby the tapered flange portion 20 of the plug deforms or flares the stock Sa into the cupped recess 12 of nut 10 and around the hole 34 as at x while at the same time the pointed projections 14 of the nut 10 engage and "bite" into engagement with the surface of the stock Sa with the projections 14 engaging the surface of the stock Sa the nut resists rotation. A portion of the stock Sa is drawn into the cupped surface to form the depression as at x of the nut 10. The flared flange portion 20 of the draw-up plug is substantially within the flared portion 19 of the stock Sa and the top surface 22 substantially flush with the surface of the stock Sa. Thus the plug and nut are secured to the stock Sa against rotation which forms a base of connection in stock Sa for the bolt 28.

A hole 33 is then formed through the stock S. Then the stock S is placed upon the stock Sa with the hole 33 in alignment with the hole 26. The draw-up bolt 28 is then positioned through the hole of the washer W and the hole 33 of the stock S and threadedly engaged with the threads 26 of the plug 16. The bolt 28 is then drawn up whereby the stock S is tightly connected to the stock Sa, the projections 14 in penetrating "biting" engagement with the stock Sa.

What is claimed is:

1. A fastening device comprising:
   a. a threaded base member in the form of a nut having
   b. a concave recess in one end thereof forming at least one
   c. projection at the periphery thereof for engaging a surface,
   d. a connecting member having a threaded shank,
   e. a threaded draw-up plug for threaded engagement with said base member nut and having a frusto-conical flared portion, and
   f. said draw-up plug having a threaded bore for receiving said threaded connecting member,
   g. means on said draw-up plug for drawing up said draw-up plug extended through and upon a piece of flat stock upon said base member whereby said flared portion of said draw-up plug deforms a portion of the flat stock and forces it into said concave recess of said base member with said projections of said base member grippingly engaged with the piece of stock, said connecting member threadedly and internally engaged with said draw-up plug.

2. The device of claim 1 in which
   a. said means for drawing up said draw-up plug includes a socket therein for receiving a wrench.

3. A base fastening device comprising:
   a. a threaded base member in the form of a nut and having
   b. a concave recess in one end thereof forming
   c. at least one projection thereon for engaging a surface,
   d. an externally threaded draw-up plug for threaded engagement with said base member and having a frusto-conical flared portion
   e. said draw-up plug having a threaded bore for receiving said threaded connecting member,
   f. a socket in said draw-up plug for drawing up said draw-up plug extended through and upon a piece of flat stock upon said base member whereby said flared portion of said draw-up plug deforms a portion of flat stock and forces it into said recess of said base member with said projection of said base member grippingly engaged with the piece of stock.

* * * * *